United States Patent
Buckingham et al.

(10) Patent No.: US 6,663,284 B2
(45) Date of Patent: Dec. 16, 2003

(54) PRESSURE SENSITIVE ONE-WAY VALVE

(75) Inventors: Robert Buckingham, Whitby (CA); Willem Anker, Port Perry (CA)

(73) Assignee: 1361215 Ontario Inc. (CA)

( * ) Notice: Subject to any disclaimer, the term of this patent is extended or adjusted under 35 U.S.C. 154(b) by 0 days.

(21) Appl. No.: 09/928,479

(22) Filed: Aug. 14, 2001

(65) Prior Publication Data
US 2003/0035597 A1 Feb. 20, 2003

(30) Foreign Application Priority Data
Jun. 21, 2001 (CA) ................................. 2351150

(51) Int. Cl.[7] ................................................ B65D 33/01
(52) U.S. Cl. ............. 383/103; 220/203.15; 220/203.16
(58) Field of Search ................................ 383/100, 101, 383/102, 103; 220/203.11, 203.15, 203.16, 203.18; 426/118

(56) References Cited

U.S. PATENT DOCUMENTS

| | | | | |
|---|---|---|---|---|
| 2,821,338 A | * | 1/1958 | Metzger | 383/94 |
| 2,870,954 A | * | 1/1959 | Kulesza | 206/524.8 |
| 2,927,722 A | * | 3/1960 | Metzger | 383/94 |
| 2,946,502 A | * | 7/1960 | Mtezger | 383/94 |
| 3,468,471 A | * | 9/1969 | Linder | 206/439 |
| 4,122,993 A | * | 10/1978 | Glas | 383/103 |
| 4,206,870 A | * | 6/1980 | DeVries | 383/103 |
| 5,059,036 A | | 10/1991 | Richison | |
| 5,263,777 A | * | 11/1993 | Domke | 383/103 |
| 5,326,176 A | * | 7/1994 | Domke | 383/103 |
| 5,419,638 A | | 5/1995 | Jamison | |
| 5,427,839 A | * | 6/1995 | Buchner et al. | 428/192 |
| 5,584,409 A | * | 12/1996 | Chemberlen | 220/89.1 |
| 5,727,881 A | * | 3/1998 | Domke | 383/103 |
| 5,829,884 A | | 11/1998 | Yeager | |
| 5,899,218 A | | 5/1999 | Dugan | |
| 5,989,608 A | * | 11/1999 | Mizuno | 426/113 |

FOREIGN PATENT DOCUMENTS

JP 0279073 * 11/1989 ................. 383/103

* cited by examiner

Primary Examiner—Jes F. Pascua
(74) Attorney, Agent, or Firm—Merek, Blackmon & Voorhees, LLC (57) ABSTRACT

A pressure sensitive one-way valve to control the release of pressurized gas from a sealed container wherein the sealed container has at least one venting aperture therein. The valve comprises a first layer of flexibly resilient material having an upper surface and a lower surface. At least the periphery of the lower surface of the first layer is adhered to the outer surface of the container and at least a portion of the interior of the lower surface is separable from the outer surface of the container. The separable portion and the portion of the outer surface of the container adjacent thereto forming an expansion chamber that is in communication with the venting apertures such that passage of gas through the venting aperture causes expansion of the expansion chamber. The expansion chamber also has a gas release aperture extending therethrough. The valve also comprises a second layer of flexibly resilient material at least partially covering the first layer with a portion of the second layer adhered to the first layer and a portion of the second layer separable from the first layer. The separable portion of the second layer forms a gas exiting passageway that is in communication with the gas release aperture extending through the expansion chamber permitting the flow of gas out of the valve into the environment.

16 Claims, 4 Drawing Sheets

PRESSURE SENSITIVE ONE-WAY VALVE

FIELD OF THE INVENTION

This invention relates to pressure sensitive one-way valves, and in particular pressure sensitive one-way gas release valves that may be used to automatically release gas pressure built up within a vessel or container.

BACKGROUND OF THE INVENTION

A variety of different products have a tendency of releasing or emitting gas after they have been placed within a sealed package, container, or vessel. For example, roasted coffee beans have a tendency to release a significant quantity of carbon dioxide following the roasting process, much of which is often released after the roasted coffee has been placed within a sealed container. Should the container or packaging be devoid of any mechanism to allow for the release of built up gas pressure, the walls of the container will have a tendency to expand outward, and depending upon their integral strength, could potentially rupture and fail. Where the container does not rupture a build up of gas can cause a bulge or expansion in the container's walls making it unattractive from the perspective of a consumer, and also presenting difficulty for the retailer who attempts to maximize the use of retail shelf space. To accommodate the build up and evolution of gases in such circumstances others have proposed the placement of relief valves within the walls of the packaging or container to permit excessive amounts of gases to be slowly bled off, and to prevent the otherwise deleterious effects of an expanding package or container.

In most circumstances, the packaging or container within which a product is placed for transportation and retail sale (particularly in the case of food products) must be relatively inexpensive in order to gain market acceptance. The necessity for inexpensive packaging has resulted in the majority of prior developed valves or pressure release devices being of a relatively simplistic nature, designed primarily from the perspective of allowing built up gas within a container to be bled off. Most often the ability of the valve to function as a one-way valve only, and to prevent the ingress of air from the exterior environment into the sealed packaging or container, is an incidental feature. Many prior existing valve structures provide only a minimal degree of security against the possibility of air travelling backwardly through the valve and into the packaging. For many products incidental contact with air that may seep back through a gas release valve is not of significant concern. However, in other instances any contact with air whatsoever can have a serious effect on the quality and characteristics of the products. For example, roasted coffee that comes into contact with air will quickly oxidize tending to give the coffee a bitter taste. The ingress of air into a sealed and packaged product may also introduce water vapour and/or bacteria into the product that could cause fungal growth or spoilage.

Further, many existing relief valve structures are designed to open at a very low differential pressure between gas within the container and the outside atmospheric pressure. The simplicity and structure of such valves normally causes them to open upon a minimal increase in internal gas pressure. However, where the container packaging is sufficiently strong there can sometimes be an advantage gained by maintaining a higher internal gas pressure. For example, once again with reference to roasted coffee beans, it has been determined that the flavour and aroma of roasted coffee is enhanced if it is allowed to remain in contact with carbon dioxide and aromatic gases that evolve from it following roasting. Maintaining the gas pressure within the container above atmospheric will also have the added benefit of helping to prevent the ingress of environmental air back through the valve and into the seal container.

SUMMARY OF THE INVENTION

The invention therefore provides a pressure sensitive one-way valve that helps to address a number of the deficiencies in prior existing devices. The invention provides such a one-way valve that permits the release of built up gas from within a sealed container or package while at the same time preventing or limiting the ingress of air through the valve and into the container or package. The valve is also of a structure that permits the maintenance of a higher than atmosphere internal gas pressure within the container or package where such is desired.

Accordingly, in one of its aspects the invention provides a pressure sensitive one-way valve to control the release of pressurized gas from a sealed container wherein the sealed container has at least one venting aperture therein, the valve comprising a first layer of flexibly resilient material having an upper surface and a lower surface, at least the periphery of said lower surface of said first layer adhered to the outer surface of the container with at least a portion of the interior of said lower surface of said first layer separable from the outer surface of the container, said separable portion of said lower surface of said first layer and the portion of the outer surface of the container adjacent thereto forming an expansion chamber therebetween, said expansion chamber in communication with said venting aperture through said container such that passage of gas through said venting aperture causes expansion of said expansion chamber, said expansion chamber having a gas release aperture extending therethrough permitting the release of gas from said expansion chamber; and, a second layer of flexibly resilient material at least partially covering said first layer with a portion of said second layer adhered to said first layer and a portion of said second layer separable from said first layer, said separable portion of said second layer and the portion of said first layer adjacent thereto forming a gas exiting passageway, said gas exiting passageway in communication with said gas release aperture extending through said expansion chamber, such that expansion of said expansion chamber exerts a lifting force upon said second layer causing said separable portion between said first and said second layers to diverge thereby opening said gas exiting passageway and permitting the flow of gas from the venting aperture in the container through said expansion chamber, through said gas release aperture extending through said expansion chamber, into said gas exiting passageway, and out of said valve into the environment.

In a further aspect the invention provides a pressure sensitive one-way valve to control the release of pressurized gas from a sealed container, the valve comprising a substrate of material adhered to a portion of the outer surface of the container and having extending therethrough one or more apertures aligned with one or more venting apertures extending through the container; a first layer of flexibly resilient material having an upper surface and a lower surface, at least the periphery of said lower surface of said first layer adhered to said substrate layer with at least a portion of the interior of said lower surface of said first layer separable from said substrate layer, said separable portion of said lower surface of said first layer and the portion of said substrate layer adjacent thereto forming an expansion chamber therebetween, said expansion chamber in communication with said venting aperture through said container and said aperture through said substrate layer such that passage of gas through said venting aperture causes expansion of said expansion chamber, said expansion chamber having a gas release aperture extending therethrough permitting the release of gas from said expansion chamber; and, a second layer of flexibly resilient material at least partially covering said first layer with a portion of said second layer adhered to said first layer and a portion of said second layer separable from said first layer, said separable portion of said second layer and the portion of said first layer adjacent thereto forming a gas exiting passageway, said gas exiting passageway in communication with said gas release aperture extending through said expansion chamber, such that expansion of said expansion chamber exerts a lifting force upon said second layer causing said separable portion between said first and said second layers to diverge thereby opening said gas exiting passageway and permitting the flow of gas from the venting aperture in the container through said expansion chamber, through said gas release aperture extending through said expansion chamber, into said gas exiting passageway, and out of said valve into the environment.

Further advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
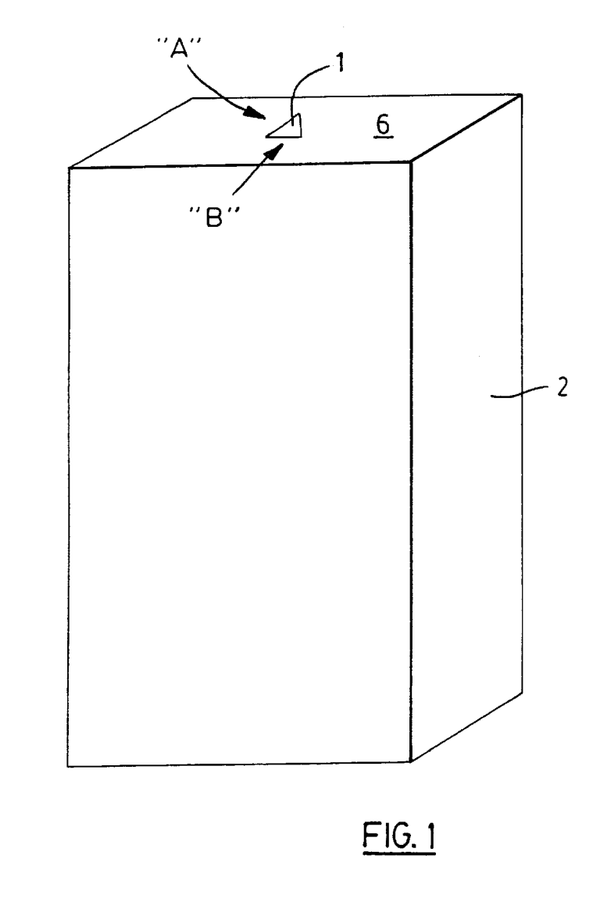
FIG. 1 is a side elevational view of a container to which the pressure sensitive one-way valve in accordance with one preferred embodiment of the present invention has been attached.
Figure 2:
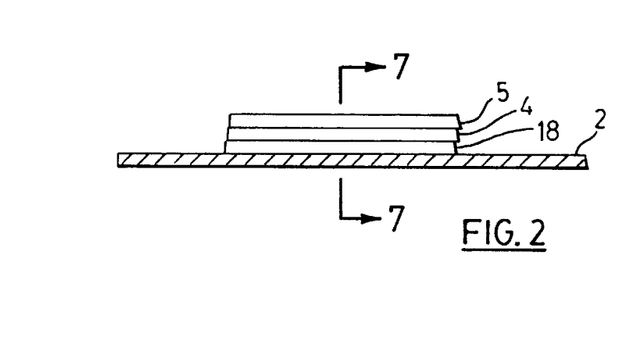
FIG. 2 is a side elevational view of the pressure sensitive one-way valve as viewed from direction "A" in FIG. 1.
Figure 3:
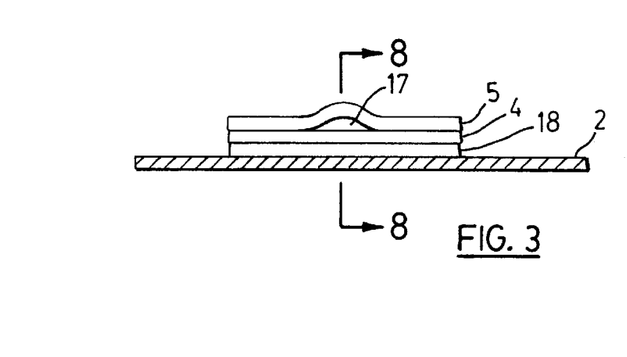
FIG. 3 is a side elevational view of the pressure sensitive one-way valve as viewed from direction "B" of FIG. 1.
Figure 4:
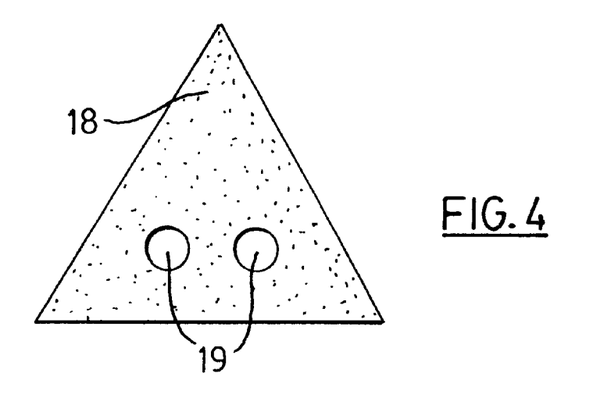
FIG. 4 is a plan view of a lower substrate layer of the pressure sensitive one-way valve in accordance with one preferred embodiment of the present invention.

The pressure sensitive one-way valve constructed in accordance with a preferred embodiment of the present invention is generally identified in the attached drawings by reference numeral 1. In FIG. 1, valve I is shown as it would typically be attached to a sealed or enclosed container or package 2. It will be appreciated from a thorough understanding of the invention that container 2 could be of a very wide variety of different structures that are currently available, ranging from rigid plastic, nylon, metal, composite, or glass containers, to semi-rigid plastic, cellulose, or metal containers, to flexible containers manufactured from plastics, foils or similar materials. Container 2 preferably has at least one venting aperture 3 extending therethrough that allows for the venting of excess, built up, internal gas from within the enclosed container. Venting aperture 3 may be formed during the construction of container 2, or subsequently drilled, punched or otherwise formed within one of the container's walls or ends at a later point.

Figure 5:
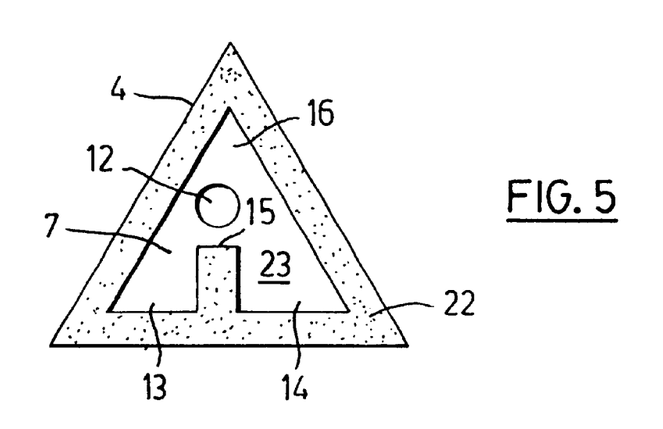
FIG. 5 is a plan view of an intermediate layer of the pressure sensitive one-way valve in accordance with one preferred embodiment of the present invention.

Valve 1 is comprised generally of a first layer of flexibly resilient material 4 and a second layer of flexibly resilient material 5 that at least partially covers first layer 4. First layer 4 has an upper and a lower surface. In one preferred embodiment at least the periphery of the lower surface of first layer 4 is adhered to the outer surface 6 of container 2. Depending upon the material from which container 2 is constructed, the method of adhering the lower surface of first layer 4 to the outer surface 6 of the container may vary, however, typically an adhesive would be utilized. With the periphery of the lower surface of first layer 4 adhered to the outer surface of container 2, at least a portion of the interior of the lower surface of the first layer remains unattached to the container and separable therefrom. In FIG. 5 the portion of the lower surface of first layer 4 adhered to the outer surface of the container is shaded and identified generally by reference number 22 with the separable portion unshaded and identified generally by reference number 23. The separable portion of the lower surface of first layer 4, and the portion of outer surface 6 of container 2 adjacent thereto, define between them an expansion chamber 7. First layer 4 is situated upon outer surface 6 of container 2 such that expansion chamber 7 is in communication with venting apertures 3 so that gas exiting the container and passing through the venting apertures will be directed into the expansion chamber.

In one preferred embodiment of the invention expansion chamber 7 is comprised of two separate chambers, 13 and 14, separated by an isthmus 15. A common cross over chamber 16, the location and size of which can be varied for different pressure release requirements, and allows for gas to pass freely between chambers 13 and 14, and also presents a location for the positioning a gas release aperture 12 that permits gas to be bled off from the expansion chamber. Where expansion chamber 7 is comprised of two separate chambers, each individual chamber is preferably in communication with a separate venting aperture 3 through container 2 such that both portions of the expansion chamber will generally expand at the same rate upon a passage of gas through the venting apertures. Cross over chamber 16 will generally ensure that the gas pressure within chambers 13 and 14 is essentially balanced and will also allow for a balanced release of gas through aperture 12. In addition venting apertures 3 are preferably in communication with first and second chambers 13 and 14 at an opposite end of expansion chamber 7 relative to gas release aperture 12. In this manner gas entering the expansion chamber through venting aperture 3 is forced to travel through the length of the expansion chamber before being released through gas release aperture 12. If desired to enhance gas release by valve 1, isthmus 15 may be extended so that it essentially contacts aperture 12.

In the preferred embodiment of the invention, the flexibly resilient material from which first layer 4 and second layer 5 are constructed also exhibits characteristics of elasticity such that the passage of gas through venting aperture 3 into expansion chamber 7 causes the expansion chamber to expand and the upper surface of first layer 4 adjacent the expansion chamber to billow outwardly. While layers 4 and 5 may be constructed from a wide range of materials, it is expected that in many instances they will be formed from metallized polyester, polypropylene, nylon or a similar material such that when the gas within the expansion chamber is released (as described in more detail below) the resiliency and elasticity of first layer 4 causes expansion chamber 7 to retract with the separable portion of the lower surface of first layer 4 once again allowed to lay flat across outer surface 6 of container 2. In so doing, the lower surface of first layer 4 will have a tendency to seal venting apertures 3, thereby helping to limit the ingress of air and water vapour through the apertures and into container 2.

Second layer 5 is preferably formed from the same, or a substantially similar, material as first layer 4 and is of the same, or substantially, similar shape such that the second layer overlays the first layer with a portion of the lower surface of the second layer adhered to the upper surface of the first layer, and a portion of the second layer separable from the first layer. Once again, typically and adhesive would be utilized to secure the second layer to the first layer, however, a variety of other fastening mechanisms may equally be used, including heat sealing the two layers together or the use of mechanical fastening mechanisms.

Figure 6:
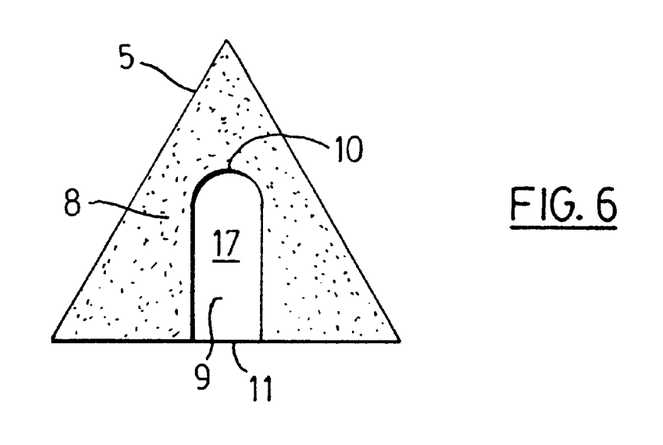
FIG. 6 is a plan view of an upper layer of the pressure sensitive one-way valve in accordance with one preferred embodiment of the present invention.
Figure 7:
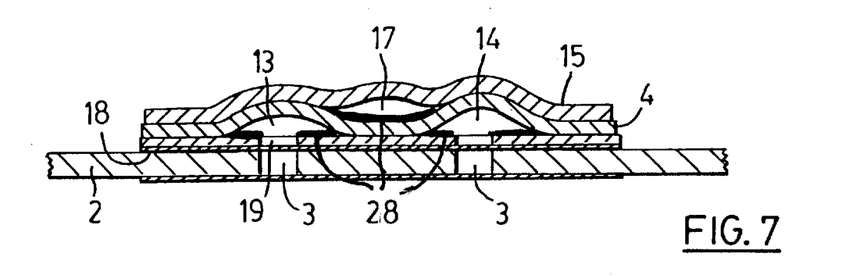
FIG. 7 is a sectional view taken along the line 7—7 of FIG. 2.
Figure 8:
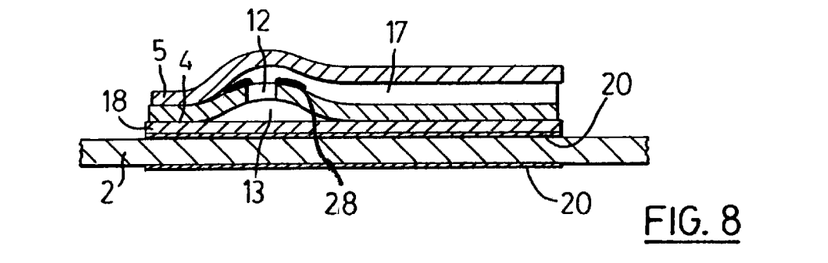
FIG. 8 is a sectional view taken along the line 8—8 of FIG. 3.
Figure 9:
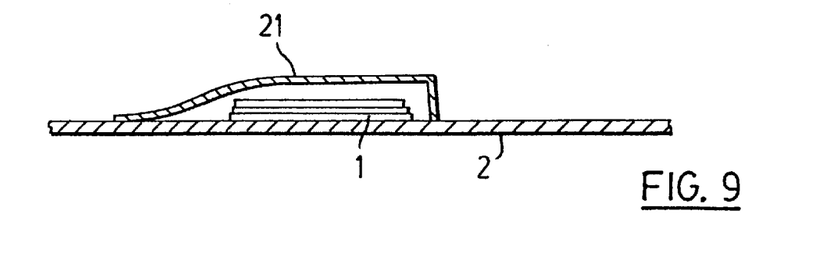
FIG. 9 is a side elevational view of an alternate embodiment of the pressure sensitive one-way valve shown in FIG. 2 having received thereover a protective outer covering.

With reference to FIG. 6, the portion of second layer 5 that is preferably adhered to first layer 4 is shaded and indicated generally by reference numeral 8 with the separable portion of second layer 5 unshaded and identified generally by reference numeral 9. Separable portion 9 is generally in the shape of a blind passageway having an enclosed internal end 10 and an open mouth 11 that extends through the side of valve 1. Separable portion 9 is preferably dimensioned such that when second layer 5 is adhered to first layer 4 enclosed end 10 is in communication with gas release aperture 12 extending through expansion chamber 7. Separable portion 9 thus forms a gas exiting passageway 17 that extends from gas release aperture 12 through the side of valve 1.

In accordance with the above described structure it will appreciate and understood that as gas exits container 2 through venting apertures 3 it will pass into expansion chamber 7 and be directed toward gas release aperture 12, thereby causing an outward billowing of the expansion chamber. For some applications of value 1, gas release aperture 12 may have an opening somewhat smaller than the combined area of venting apertures 3 such that it has a slight choking effect that tends to hold back a portion of the gas that enters the expansion chamber, allowing the expansion chamber to expand. As the gas exits the expansion chamber through gas release aperture 12 it will be directed into gas exiting passageway 17 formed between first layer 4 and second layer 5.

In the embodiment shown in FIGS. 5 and 6, where expansion chamber 7 is comprised of first and second chambers 13 and 14 separated by isthmus 15, the isthmus will be preferably adhered to the outer surface of the container such that gas exiting expansion chamber 7 through gas release aperture 12 will cause a separation of first and second layers 4 and 5 generally along isthmus 15, thereby forming gas exiting passageway 17 and allowing gas to be expelled into the environment. Where sufficient gas has been released from container 2 and the internal gas pressure is no longer able to overcome the resiliency of first and second layers 4 and 5, gas exiting passageway 17 and expansion chamber 7 will tend to collapse or retract with second layer 5 tending to seal gas release aperture 12 and first layer 4 sealing venting apertures 3. In this manner the likelihood of atmospheric gases travelling backwardly through valve 1 and making their way into container 2 is significantly diminished.

It will be appreciated and understood by those having skill in the art that depending upon the physical dimensions of the various components of valve 1, the material from which first and second layers 4 and 5 are constructed, and the size and location of apertures 3 and 12, the valve may be designed to maintain a particular level of positive gas pressure within container 2 within a relatively broad range of values. The resiliency and elasticity of first and second layers 4 and 5 will have a tendency of maintaining a seal against venting apertures 3 and gas release aperture 12 until such point as the internal gas pressure within container 2 rises to a sufficient degree to overcome the resiliency and elasticity of the first and second layers. To enhance the seal of the various apertures the first layer may be adhered to the outer surface of the container, and the second layer adhered to the first layer, in a relatively tight or taut manner.

While the construction of container 2 will to a large extent determine the amount of internal pressure that may be maintained before it becomes necessary to vent gas through valve 1, in most applications valve 1 will be designed to release internal pressure when the pressure within the container exceeds atmospheric pressure from about 0.1 psi to 15 psi. In this manner valve 1 will operate to ensure that the internal pressure within container 2 must exceed atmospheric pressure to open the valve, thereby acting as fail safe to further prevent the possibility of the influx of atmospheric gases back through the valve and into the container. The maintenance of an elevated pressure within container 2, and the ability of valve 1 to reseat itself automatically upon a drop in the internal gas pressure within the chamber, is further enhanced through the location of venting apertures 3 and gas release aperture 12 at opposite ends of expansion chamber 7. This structure, together with the positioning of gas exiting passageway 17 such that gas release aperture 12 is in communication with enclosed end 10 of gas exiting passageway 17, creates a tortuous gas pathway through valve 1 along which gas must pass in order to be vented from the interior of the container to the environment.

The above described embodiment of the invention is designed generally for use with a container having a sufficient structural rigidity such that its outer surface 6 remains essentially flat when the container is internally pressurized below values at which valve 1 opens to release internal gas pressure. In this manner, with the valve adhered to the outer surface of the container the integrity of the valve will be maintained and leakage about the periphery of the valve will not occur. However, for containers having less structural rigidity, and in particular for flexible containers, valve 1 preferably includes a substrate layer 18 that is positioned between the outer surface 6 of container 2 and first layer 4. Substrate layer 18 is adhered to the surface of the container and has extending through it one or more apertures 19 generally aligned with venting apertures 3. Once again it will be appreciated that, as in the case of apertures 3 and 12, the size of apertures 19 could be varied to control the operation of valve 1 and the internal pressure within container 2. With substrate layer 18 in place, first layer 4 is then adhered to substrate layer 18 in essentially the same fashion as described above with respect to the instance where container 2 is of sufficient rigidity to allow for the first layer to be adhered directly to its outer surface. In essence, the function of the substrate layer is to act as a carrier for valve 1, and to provide sufficient strength and rigidity about venting apertures 3 to eliminate leakage and ensure that gas flowing through the venting apertures is directed into valve 1, and in particular into expansion chamber 7.

Figure 10:
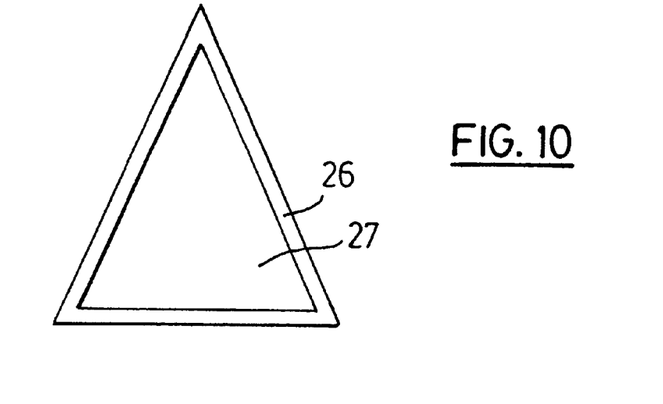
FIG. 10 is a plan view of a frame member for use in accordance with an alternate embodiment of the invention.
Figure 11:
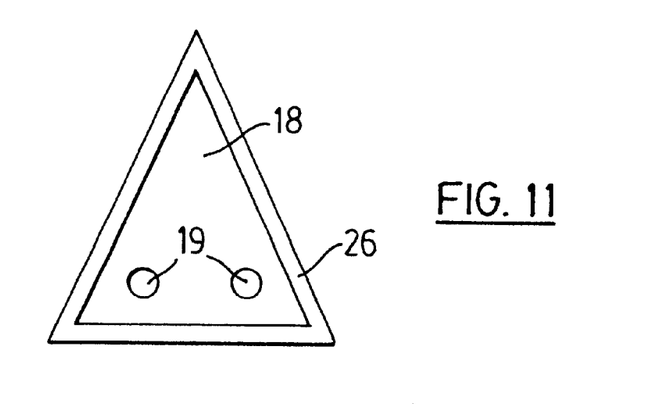
FIG. 11 is a plan view of an alternate embodiment of the lower substrate layer of the pressure sensitive one-way valve; and, FIG. 12 is a side elevational view of the alternate embodiment of the lower substrate layer of the pressure sensitive one-way valve shown in FIG. 1.
Figure 12:
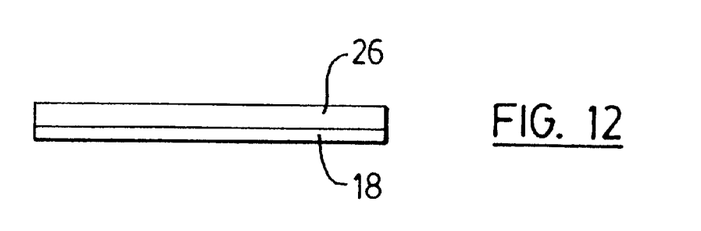

In the alternate embodiment of the invention as shown in FIGS. 10, 11 and 12, there is included a frame member 25 secured directly to the outer surface of container 2, beneath valve 1. Frame member 25 has an enclosed outer perimeter 26 and a generally open interior 27 and preferably is of a shape closely matching that of valve 1. Frame member 25 may be independent from the remainder of valve 1 (FIG. 10) or alternately may be integrated into the valve by means of attachment to either first layer 4 or substrate layer 18 (FIGS. 11 and 12). Depending upon the particular construction of first layer 4 and substrate layer 18, the integrated frame member may be formed therewith or may be attached to one of the respective layers through the use of an adhesive.

Regardless of the particular construction of frame member 25 its utilization removes the necessity to closely align venting apertures 3 with expansion chamber 7 (or with apertures 19 where substrate layer 18 is used). When secured to container 2 about venting apertures 3 with valve 1 received thereover, the frame member will form an additional sealed chamber beneath the lower surface of the valve. Venting apertures 3 deliver gas exiting the interior of the chamber directly into this lower chamber where, depending upon whether substrate layer 18 is utilized, the gas will either pass directly into expansion chamber 7, or first through apertures 19 in the substrate layer and then into the expansion chamber. Since venting apertures 3 may communicate with any aspect of the chamber formed by frame member 25 there is no need to specifically align with the expansion chamber or apertures 19 with venting apertures 3, thereby simplifying the application of valve 1 to the surface of container 2.

Depending upon the nature of the materials stored within container 2, it may be preferable to utilize a filter media 20 to prevent the ingress of liquid or solid materials from within the container into the valve structure. Filter media 20 may take one of a wide variety of different physical structures that will, once again, to a large extent depend upon the contents of container 2. However, generally it is expected that filter media 20 will be comprised of a paper or cellulose filter material, or alternatively, a nonwoven fabric. Filter material 20 may be adhered to outer surface 6 of container 2 about venting apertures 3 and/or secured or otherwise adhered to the inner surface of the container about the venting apertures. Alternately, filter media 20 may be incorporated into valve 1 and may comprise its lowermost layer. In either instance the function of the filter media is to maintain the contents of container 2 therein and prevent them from entering valve 1 or plugging any of the internal apertures or passageways within the valve.

The ability of the valve to reseat itself and maintain a desired level of internal pressure within container 2 may also be enhanced through forming venting apertures 3 and gas release aperture 12 such that they are generally circular in nature. Circular apertures have a tendency to provide for a smooth point of contact when reseating and help to avoid folding or creasing of the material which may otherwise cause leakage or failure. In addition, a sealant 28 may be positioned about venting apertures 3, and/or gas release aperture 12, and/or within expansion chamber 7 and gas exit passageway 17. The sealant may be comprised of materials such as silicone, wax, grease, oil or other similar materials that will generally serve the function of helping to maintain the valve in a closed configuration until the pressure differential between the interior of the container and the outside atmosphere exceeds a pre-determined limit. In general, the sealant will not assist in reseating but instead will help to assist in determining the amount of pressure differential required between the interior of the container and the outside atmosphere before the valve will open. Once again, depending upon the particular application of valve 1, the sealant materials may have a different degree of tackiness or exhibit different degrees of cohesion with the surfaces of the various layers of the valve.

Finally, in order to protect valve 1 from becoming damaged, and to ensure that there is sufficient space adjacent to the valve to allow it to expand and open properly, in a preferred embodiment of the invention the valve includes a semi-rigid protective outer cover 21. Cover 21 generally encompasses second layer 5 and is offset from the second layer by a sufficient degree to allow for expansion of expansion chamber 7 and the opening of gas exiting passageway 17. Cover 21 is sufficiently permeable, or otherwise contains openings therethrough, to allow for the unrestricted flow of gas out of valve 1. The cover may be formed from a plastic, nylon or other suitable semi-rigid or rigid material and can be fixed to either the top of the valve as an additional layer, or fixed directly to the outer surface of container 2.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while reference has been made to particular shapes, sizes and relative locations of the component parts of valve 1, it will be appreciated that depending upon the particular application of the valve, the location and sizes of the various apertures, the materials from which the various layers of the value are constructed, the size and number of expansion chambers, etc, could be altered to allow the valve to maintain different levels of pressure within the container before being activated.

We claim:

1. A pressure sensitive one-way valve to control the release of pressurized gas from a sealed container wherein the sealed container has at least one venting aperture therein, the valve comprising:
   (i) a first layer of flexibly resilient material having an upper surface and a lower surface, at least the periphery of said lower surface of said first layer adhered to the outer surface of the container with at least a portion of the interior of said lower surface of said first layer separable from the outer surface of the container, said separable portion of said lower surface of said first layer and the portion of the outer surface of the container adjacent thereto forming an expansion chamber therebetween, said expansion chamber in communication with said venting aperture through said container such that passage of gas through said venting aperture causes expansion of said expansion chamber, said expansion chamber having a gas release aperture extending therethrough permitting the release of gas from said expansion chamber; and, (ii) a second layer of flexibly resilient material at least partially covering said first layer with a portion of said second layer adhered to said first layer and a portion of said second layer separable from said first layer, said separable portion of said second layer and the portion of said first layer adjacent thereto forming a gas exiting passageway, said gas exiting passageway in communication with said gas release aperture extending through said expansion chamber, such that expansion of said expansion chamber exerts a lifting force upon said second layer causing said separable portion between said first and said second layers to diverge thereby opening said gas exiting passageway and permitting the flow of gas from the venting aperture in the container through said expansion chamber, through said gas release aperture extending through said expansion chamber, into said gas exiting passageway, and out of said valve into the environment.

2. The device as claimed in claim 1 wherein said first layer is adhered to the outer surface of the container and said second layer is adhered to said first layer in a taut configuration such that when the pressure differential between gas in the container and the atmosphere surrounding the container is below a predetermined limit the flexible resiliency of said first and said second layers cause a retraction of said gas exiting passageway and said expansion chamber thereby sealing said gas release aperture through said expansion chamber and the venting aperture through the container to restrict the flow of atmospheric gases into the container.

3. The device as claimed in claim 1 wherein said gas release aperture extending through said expansion chamber is at an opposite end of said expansion chamber from the point of communication between said expansion chamber and the venting aperture through the container, and said gas release aperture extending through said expansion chamber in communication with an enclosed interior end of said gas exiting passageway such that upon expansion of said expansion chamber and the opening of said gas exiting passageway a tortuous gas pathway is formed between the interior of the container, through said valve and into the environment.

4. The device as claimed in claim 1 wherein the container has two venting apertures extending therethrough, said separable portion of said lower surface of said first layer and the portion of the outer surface of the container adjacent thereto forming two expansion chambers therebetween, each of said venting apertures in communication with a separate expansion chamber, said expansion chambers connected by a common gas passageway having located therein said gas release aperture.

5. The device as claimed in claim 1 including a sealant positioned about the venting aperture extending through the container and about said gas release aperture extending through said expansion chamber, said sealant helping to maintain said valve in a closed configuration until the pressure differential between the interior of the container and the outside atmosphere exceeds a predetermined limit.

6. The device as claimed in claim 1 further including a frame member having an enclosed outer perimeter and a generally open interior, said frame member adhered to the outside surface of the container and positioned about the venting apertures through the container, said first layer of flexibly resilient material adhered to said frame member creating a chamber between said first layer and the outer surface of the container.

7. A pressure sensitive one-way valve to control the release of pressurized gas from a sealed container wherein the sealed container has at least one venting aperture therein, the valve comprising:

(i) a substrate layer of material, said substrate layer adhered to the outer surface of the container and having extending therethrough one or more apertures aligned with the venting apertures extending through the container;

(ii) a first layer of flexibly resilient material having an upper surface and a lower surface, at least the periphery of said lower surface of said first layer adhered to said substrate layer with at least a portion of the interior of said lower surface of said first layer separable from said substrate layer, said separable portion of said lower surface of said first layer and the portion of said substrate layer adjacent thereto forming an expansion chamber therebetween, said expansion chamber in communication with said venting aperture through said container such that passage of gas through said venting aperture causes expansion of said expansion chamber, said expansion chamber having a gas release aperture extending therethrough permitting the release of gas from said expansion chamber; and, (iii) a second layer of flexibly resilient material at least partially covering said first layer with a portion of said second layer adhered to said first layer and a portion of said second layer separable from said first layer, said separable portion of said second layer and the portion of said first layer adjacent thereto forming a gas exiting passageway, said gas exiting passageway in communication with said gas release aperture of said expansion chamber such that expansion of said expansion chamber exerts a lifting force upon said second layer causing said separable portion between said first and said second layers to diverge thereby opening said gas exiting passageway and permitting the flow of gas from the venting aperture in the container through said expansion chamber, through said gas release aperture extending through said expansion chamber, into said gas exiting passageway, and out of said valve into the environment.

8. The device as claimed in claim 7 including a frame member having an enclosed outer perimeter and a generally open interior, said frame member adhered to the lower surface of said substrate layer such that when said substrate layer is adhered to the outer surface of the container a chamber is created between said substrate layer and the outer surface of the container.

9. The device as claimed in claim 8 including a semi-rigid protective outer covering encompassing said second layer to prevent damage to said valve and to permit expansion of said-expansion chamber and opening of said gas exiting passageway in the event of contact between said valve and an adjacent article.

10. The device as claimed in claim 9 including filter media adhered to the outer surface of the container about the venting apertures extending therethrough to prevent the ingress of liquid or solid material from within the container into said valve.

11. The device as claimed in claim 10 wherein the venting apertures and said gas release aperture through said expansion chamber are generally circular.

12. The device as claimed in claim 9 including filter media adhered to the inner surface of the container about the venting apertures that extend therethrough to prevent the ingress of liquid or solid material within the container into said valve.

13. A pressure sensitive one-way valve to control the release of pressurized gas from a sealed container, the valve comprising:

(i) a substrate of material adhered to a portion of the outer surface of the container and having extending therethrough one or more apertures generally aligned with one or more venting apertures extending through the container;

(ii) a first layer of flexibly resilient material having an upper surface and a lower surface, at least the periphery of said lower surface of said first layer adhered to said substrate layer with at least a portion of the interior of said lower surface of said first layer separable from said substrate layer, said separable portion of said lower surface of said first layer and the portion of said substrate layer adjacent thereto forming an expansion chamber therebetween, said expansion chamber in communication with said venting aperture through said container and said aperture through said substrate layer such that passage of gas through said venting aperture causes expansion of said expansion chamber, said expansion chamber having a gas release aperture extending therethrough permitting the release of gas from said expansion chamber; and, (iii) a second layer of flexibly resilient material at least partially covering said first layer with a portion of said second layer adhered to said first layer and a portion of said second layer separable from said first layer, said separable portion of said second layer and the portion of said first layer adjacent thereto forming a gas exiting passageway, said gas exiting passageway in communication with said gas release aperture extending through said expansion chamber, such that expansion of said expansion chamber exerts a lifting force upon said second layer causing said separable portion between said first and said second layers to diverge thereby opening said gas exiting passageway and permitting the flow of gas from the venting aperture in the container through said expansion chamber, through said gas release aperture extending through said expansion chamber, into said gas exiting passageway, and out of said valve into the environment.

14. The device as claimed in claim 13 wherein the container has two venting apertures extending therethrough, said separable portion of said lower surface of said first layer and the portion of said substrate layer adjacent thereto forming two expansion chambers therebetween, each of said venting apertures in communication with a separate expansion chamber, said expansion chambers connected by a common gas passageway having located therein said gas release aperture.

15. The device as claimed in claim 13 including a semi-rigid protective outer covering encompassing said second layer to prevent damage to said valve and to permit expansion of said expansion chamber and opening of said gas exiting passageway in the event of contact between said valve and an adjacent article.

16. The device as claimed in claim 13 including a frame member having an enclosed outer perimeter and a generally open interior, said frame member adhered to the lower surface of said substrate layer such that when said substrate layer is adhered to the outer surface of the container a chamber is created between said substrate layer and the outer surface of the container.

* * * * *